Patented June 23, 1936

2,045,468

UNITED STATES PATENT OFFICE 2,045,468

INSULATING COMPOSITION

Artemy A. Horvath, Newark, Del., assignor to Wilmington Fibre Specialty Company, a corporation of Delaware No Drawing. Application October 27, 1934, Serial No. 750,395

16 Claims. (Cl. 91—68)

My invention aims to provide an insulating vulcanized fibre composition having the desirable physical properties of vulcanized fibre as heretofore made, but having a much smaller capacity for absorbing water, whereby the presence of moisture will not appreciably affect the insulating and dielectric characteristics; and my invention embraces both the composition as such and a method of treating vulcanized fibre to make the same.

Vulcanized fibre is a well known product and for many years has been widely used for electrical insulation purposes. In accordance with my invention I produce vulcanized fibre containing distributed therein a condensation product of formaldehyde and soy-bean protein material which not only does not impair the electrical properties of the vulcanized fibre in the dry or moist state but prevents absorption of water to such an extent as to cause the insulating and dielectric properties of the vulcanized fibre itself to be unaffected by exposure to moisture.

Plain vulcanized fibre may be produced by treating cellulose, in the form of cotton rag paper sheets free from sizing, especially manufactured for this purpose and known as fibre paper, with a strong solution of zinc chloride ($ZnCl_2$) for a sufficient length of time to convert the cellulose fibres into a continuous gel, or jelly, thereby changing the cellulose so as to constitute a different material. The zinc chloride hydrolyzes and condenses the cellulose, with attendant formation of furfural and glucose which dissolves out, and not only produces a chemical conversion of the cellulose but changes the physical structure from a fibrous one containing capillaries and holes of discrete size, to a continuous homogeneous jelly which is not only impermeable to particles of greater than colloidal size but is impermeable to large colloidal particles. The cotton rag paper sheets contain long fibres, and as the action of the zinc chloride thereon is slow, the sheets retain coherency and mechanical strength during the transformation to the new chemical and physical state.

Following the zinc chloride treatment the thin sheet may be wound on a mandrel to produce a laminated tube, or a number of layers may be superposed to produce a laminated sheet of greater thickness, or the sheet may be utilized directly. Due to the zinc chloride solution which remains absorbed within the material, and to its gel nature, a gradual fusion occurs between adjacent layers in the case of the built up laminated forms, causing them to become strongly bonded together.

The material is then leached in baths of successively decreasing zinc chloride concentration, and lastly in pure water, so as to slowly free it from zinc chloride—this operation extending over a considerable period of time in the case of thick laminated forms in order to secure a strong bonding between layers and to prevent a weakening thereof.

After the vulcanized fibre material has been "pured out", by which is meant that when soaked in pure water no trace of zinc chloride is evident in the bath, it is in the form of a tough coherent jelly containing absorbed water, resembling a hide swelled in water. It is then air dried for a day or so to remove the water, as a result of which it becomes warped and wrinkled, following which it is smoothed out in a hot press. Lastly, it is rolled to give a polished surface and to press the material to the accurate thickness intended. The drying and pressing is not for the purpose of changing the essential nature of the material, which is already fixed as a result of the zinc chloride treatment and does not require the use of heat or pressure treatment, but is merely for the purpose of removing the absorbed water and then compacting the product to finished form.

The product can be formed by pressing and bending, and is made up into various shapes by cutting, punching, drilling, milling, etc.

The foregoing brief description of conventional steps employed in the manufacture of vulcanized fibre, and which in themselves do not constitute a part of my invention, is given in order that various aspects of my invention to be described hereafter may be clearly understood and fully appreciated. It will be understood that I am not limited to the use of vulcanized fibre produced in the manner described above, since my invention relates to a composition utilizing this general type of product irrespective of the method of manufacture.

Vulcanized fibre is highly insulating and possesses a high dielectric strength when dry, but is easily rendered hydrous when exposed to water or moisture, resulting in a marked reduction in these properties. Various expedients have been resorted to in an attempt to overcome this undesirable characteristic of vulcanized fibre, but none of these can be said to be completely satisfactory. The use of water-proof insulating coatings has many disadvantages. In many cases a coating cannot be advantageously applied to the material prior to its fabrication into the shapes for use, since such operations as cutting, drilling, etc. would produce uncoated surfaces which often would be so extensive as to greatly offset the value of the remaining coating, and also would cause an undesirable appearance. What is desired is a vulcanized fibre which is in a uniform water-proofed state throughout so that the small user can shape it without impairment of its electrical properties when exposed to moisture and without the necessity of subsequently coating or otherwise treating it. Moreover, coatings are in general undesirable because they are apt to become worn through or chipped or otherwise separated from the vulcanized fibre.

Thin pieces of vulcanized fibre are extremely flexible and even very thick pieces are characterized by an elasticity and pliancy not possessed by such products as bakelite. Hence it is desirable for the water-proofing means not to interfere with this property. A bakelite or other non-flexible coating will reduce or destroy the flexibility of the vulcanized fibre object to which applied, and will crack off from thin pieces subjected to bending.

The use of non-flexible impregnation materials likewise is subject to the disadvantage that a composition is produced which lacks the flexibility of natural vulcanized fibre, and this results, for example, when the vulcanized fibre is impregnated with bakelite.

It should of course be borne in mind that the water-proofing material is subject to the limitation that it must not impair the high insulating and dielectric characteristics of the vulcanized fibre, since such impairment would defeat the very object of water-proofing. This means that the material used must itself possess good insulating and dielectric properties, and must not introduce electrolyte material which will reduce the resistance and dielectric strength in the presence of the traces of moisture which may be absorbed even when a highly water-proof material is used.

Thus a method of water-proofing vulcanized fibre in order to be fully satisfactory should be capable of producing a composition of uniform cross-section which possesses the flexibility of natural vulcanized fibre, without impairment of the insulating and dielectric properties, and should render the insulating and dielectric properties unaffected by exposure of the product to moisture.

My invention provides a vulcanized fibre composition having the desired properties indicated above, and a method of making the same; and accordingly it will be evident that my invention is of great practical importance in the art.

In accordance with my invention I impregnate vulcanized fibre with a very dilute ammoniacal solution of soy-bean protein, the colloidal particles and molecules of which have been disintegrated or peptized by the solution to the point where they are capable of passage through hydrated vulcanized fibre, and then condense this protein material in situ with formaldehyde or the like, thereby securing dispersed throughout the vulcanized fibre a condensation product which is non-hygroscopic and impermeable to moisture and prevents water or moisture from being absorbed by the vulcanized fibre.

By reason of its mode of manufacture, vulcanized fibre possesses a homogeneous gel structure which is quite different both chemically and structurally from the fibre paper from which it is made. The fibre paper consists of cross fibres of cotton (cellulose) and is full of capillaries and holes which readily permit the passage of colloidal particles. It is well known, for example, that filter paper will not filter out colloidal particles from solutions thereof. Hence this and other paper can be easily impregnated with the soy-bean protein particles existing in the ordinary dispersed colloidal state.

This is not possible in the case of vulcanized fibre since the latter does not contain to any appreciable extent openings or passages of visible or microscopic size, but possesses a continuous gel structure. In the hydrated or hydrous state, vulcanized fibre is a tough coherent jelly which is microscopically homogeneous. As is well known, a jelly, or continuous gel mass, consists of two phases—a solid phase of molecules or colloidal particles sufficiently interlocked or interlaced to give coherency and mechanical strength, and a liquid phase dispersed therein. Drying out the hydrous vulcanized fibre causes the absorbed water phase to be removed, leaving sub-microscopic pores which readily take up water and in part account for the hygroscopic nature of vulcanized fibre. These pores are too small to permit the passage of microscopic particles and will not even permit the passage or diffusion of large protein molecules or colloids.

I have found that in order to impregnate vulcanized fibre with soy-bean protein it is essential that the protein be in a finely disintegrated state and that it is not sufficient merely to "disperse" the soy-bean protein colloid in the impregnating solution. I have found that it is necessary to split up the protein molecules into simpler molecules approaching peptones. Such soy-bean derived-proteins are able to permeate through the submicroscopic pores of the vulcanized fibre gel structure and thus permit a thorough impregnation of the body of the mass.

Splitting up of the protein molecules also results in a chemical state in which more amino groups are active. The formaldehyde, employed for condensation, combines with the amino groups and by splitting up the protein molecules more of these groups are exposed and rendered able to take part in the condensation, which is a distinct advantage and results in a better condensation product.

Various alkaline solutions have heretofore been employed for extracting the protein from soy-bean meal or flour and dispersing the same to form a colloidal solution or suspension; and formaldehyde has been used for condensing this protein material to produce plastic compositions. Such colloidal solutions and suspensions have generally contained protein molecules of relatively large size, and while they are satisfactory for impregnating paper or other fibrous material they are not capable of impregnating vulcanized fibre, since as indicated above such protein particles are of too large size to penetrate into the gel structure. Moreover, for my purpose it is necessary to employ a dispersing agent which can be removed from the vulcanized fibre following the water-proofing treatment, in order not to effect an impairment of the insulating and dielectric properties.

I employ a very dilute aqueous ammonia (ammonium hydroxide) solution for extracting the protein material from soy-bean meal or flour and disintegrating the protein particles to a suitable size for impregnation of the vulcanized fibre. I prefer to use a 0.3% solution (by weight of $NH_3$)

but any concentration within the range of about 0.1–0.5% may be used. A substantially stronger solution will not effect a sufficient breaking up of the protein particles. For example, a 3% ammonia solution is of doubtful value even for producing a true colloidal dispersion, much less for adequately peptizing or disintegrating the protein particles. On the other hand, a much weaker solution will not be strong enough to exert a peptizing action.

The very dilute ammonia solution which I use not only extracts the protein from soy-bean meal and disintegrates the agglomerations of protein particles to produce colloidal solution with high dispersion, but peptizes or digests the protein molecules to produce much simpler molecules, as poly-peptides, which have the desired small size. This protein-containing solution is thus suitable for impregnating vulcanized fibre.

After impregnation and condensation the ammonia can be easily driven from the vulcanized fibre by heating at a temperature and for a period which will not cause carbonization or decomposition of the product, and thus can be used without impairing the insulating and dielectric qualities.

Soy-bean meal or flour need only be macerated or soaked in the above-described ammonia solution to produce the desired protein solution. Agitation hastens the process and moderate heating can be used to accelerate the digestion, several hours then only being required. The residue will settle to the lower part of the container upon standing and can be separated out by decantation of the supernatant layer, followed by centrifuging. Separation is unnecessary, however, since this residue will not penetrate vulcanized fibre and hence its presence in the impregnating mixture will not be detrimental.

A preliminary digestive step may be used for the purpose of breaking down the protein particles to a greater extent, and this may be desirable when the pores of the vulcanized fibre are particularly small, as in thick pieces which have been subjected to the action of $ZnCl_2$ for a long period of time. For example, the soy-bean flour, before being treated with the ammonia solution, may be subjected for a short time to the action of a digestive enzyme to partially digest the protein; such as the proteolytic enzyme derived from the mould *Aspergillus orizae*, and papaya (papain).

The ammonia protein solution thus prepared is ready for use, but an antiseptic may be added to prevent spoilage upon long standing. The antiseptic should preferably be volatile, so that it can be removed from the vulcanized fibre composition; and should not impart an odor to the composition. Such substances as toluene and chloroform will be found suitable; but non-volatile antiseptics, such as β-naphthol, may be used.

The vulcanized fibre in its dry and pressed state may be impregnated with the solution, since as pointed out previously the dried product is water absorbent and contains pores capable of being penetrated by the peptized or digested protein which I employ. Ordinarily, however, this is inexpedient, since the sheet or other shape in which the vulcanized fibre exists will become swelled and will be warped and twisted after the subsequent drying, requiring it to be pressed over again.

It is most advantageous to water-proof the vulcanized fibre prior to finishing and following "puring out", that is, following the leaching of the vulcanized fibre to free it from the $ZnCl_2$ and/or other agents used in producing it.

The vulcanized fibre is soaked in the protein ammonia solution for sufficient time to insure a thorough penetration of the protein material, and this may involve a period of weeks or even months depending upon the thickness and the desirability of obtaining complete penetration.

In some cases it may be desirable to coagulate the protein by soaking the impregnated vulcanized fibre in a solution of acetic acid or alcohol. The absorbed acetic acid or alcohol, being volatile, can later be removed by heating.

The protein-impregnated vulcanized fibre is next transferred to a formaldehyde bath, which preferably should be a weak solution (2–10%) in order to prevent surface hardening before the interior has been penetrated. The formaldehyde solution condenses the protein in situ throughout the body of the vulcanized fibre and produces a condensation product which has the previously described desirable water-proofing characteristics and is distributed throughout the structure so as to substantially fill up the pores and prevent access of water or moisture to the vulcanized fibre itself.

A bath of hexamethylene-tetramine may be used in place of formaldehyde, followed by a bath of dilute volatile acid, such as acetic acid. The acid will decompose the hexamethylene-tetramine, liberating ammonia and formaldehyde within the body of the vulcanized fibre, and the latter will then condense the protein.

As another alternative, the protein-impregnated vulcanized fibre may be exposed to formaldehyde vapors, which will penetrate and produce the desired condensation action.

The resulting composition, containing the protein condensation product, may be air-dried as in the normal course of manufacture of finished vulcanized fibre, and is then heated in order to drive out the residual ammonia and formaldehyde. Temperatures of 75–175° C., or even higher, may be used—depending upon the desired effect to be obtained and the duration of exposure. Following this, or simultaneously, the sheets or other shapes are hot-pressed. The heating and pressing does not appear to harden or otherwise transform the condensation product.

While the foregoing method of treatment is capable of producing a product of uniform composition throughout, and this is ordinarily preferable, it will be obvious that the method can be used to water-proof vulcanized fibre to any lesser extent. Thus the impregnation with the protein solution may if desired be discontinued before the protein has completely penetrated to the interior of the vulcanized fibre mass, the subsequent treatment with formaldehyde then producing a condensation product restricted more or less to near the surface.

Having described my invention, but without any intent to be limited thereby, what I claim is as follows:

1. A method of water-proofing vulcanized fibre to render its insulating and dielectric properties unaffected by exposure to moisture, comprising treating soy-bean protein with a 0.1–0.5% aqueous ammonia solution to produce a protein solution containing finely divided dispersed protein particles, impregnating hydrous vulcanized fibre with said protein solution to distribute protein material within the structure thereof, treating the protein-impregnated vulcanized fibre with formaldehyde to form a condensation product distributed therein, and heating to dry the resulting composition and remove the ammonia and formaldehyde therefrom.

2. A method of water-proofing vulcanized fibre comprising peptizing and dispersing soy-bean protein in a very dilute ammonia solution to reduce the size of the protein particles to permit of diffusion through vulcanized fibre, impregnating vulcanized fibre with the resulting protein solution, and condensing the protein with formaldehyde.

3. A method of water-proofing vulcanized fibre comprising digesting soy-bean protein in a very dilute aqueous ammonia solution, impregnating hydrous vulcanized fibre with the resulting disintegrated and peptized protein particles, and treating with formaldehyde to form a condensation product distributed within the pores of the vulcanized fibre.

4. A method of water-proofing vulcanized fibre comprising impregnating the gel-structure thereof with soy-bean protein-derived poly-peptides of small enough molecular size to permeate, and treating with formaldehyde to form a plastic condensation product distributed therein.

5. A method of water-proofing vulcanized fibre including the steps of peptizing soy-bean protein in an aqueous ammonia solution of about 0.3% strength, impregnating vulcanized fibre with the resulting protein solution to secure a substantially uniform distribution therethrough, and impregnating with a dilute formaldehyde solution to condense the protein.

6. A method of water-proofing vulcanized fibre comprising partially digesting soy-bean protein with papaya enzyme, peptizing and dispersing the protein material in a very dilute aqueous ammonia solution, impregnating vulcanized fibre with the resulting ammonia protein solution, and condensing the protein with formaldehyde.

7. A method of water-proofing vulcanized fibre comprising partially digesting soy-bean protein with a proteolytic enzyme derived from the mould Aspergillus orizae, peptizing and dispersing the protein material in a very dilute aqueous ammonia solution, impregnating vulcanized fibre with the resulting ammonia protein solution, and condensing the protein with formaldehyde.

8. A method of water-proofing vulcanized fibre comprising partially digesting soy-bean protein with a digestive enzyme, peptizing and dispersing the protein material in a very dilute aqueous ammonia solution, impregnating vulcanized fibre with the resulting ammonia protein solution, and condensing the protein with formaldehyde.

9. A method of water-proofing vulcanized fibre comprising treating soy-bean meal or flour with a 0.1–0.5% aqueous ammonia solution to extract the protein and peptize the same, adding a suitable antiseptic to the resulting ammonia protein solution to prevent spoilage, impregnating vulcanized fibre with the solution to distribute protein material within the structure thereof, and treating with formaldehyde to form a condensation product within the pores of the vulcanized fibre.

10. An insulating composition having high insulating and dielectric properties unaffected by exposure to moisture, comprising vulcanized fibre having the surface and interior pores thereof substantially filled with a water-repellent insulating condensation product of highly peptized soy-bean protein and formaldehyde, the composition being free from non-insulating and electrolyte substances.

11. An insulating composition comprising vulcanized fibre characterized by being practically homogeneous and having pores of sub-microscopic size containing a water-repellent insulating plastic condensation product of soy-bean derived-protein and formaldehyde.

12. An insulating composition comprising a vulcanized fibre mass having a gel structure permeated with a flexible insulating water-repellent plastic condensation product of peptized and digested soy-bean protein and formaldehyde.

13. An insulating composition comprising a vulcanized fibre body having uniformly distributed therethrough an insulating water-repellent plastic condensation product of disintegrated soy-bean protein and formaldehyde produced in situ, said condensation product being free of conductive materials and electrolytes and substantially preventing reduction of the insulating and dielectric properties of the composition when exposed to moisture.

14. An insulating composition comprising a flexible body of vulcanized fibre permeated with a plastic condensation product of soy-bean derived-protein and formaldehyde, said condensation product being of a kind rendering the composition water-proof and insulating throughout without destroying the flexibility.

15. An insulating composition comprising a vulcanized fibre body permeated with a water-repellent insulating condensation product of highly peptized and disintegrated soy bean protein, free from non-insulating and electrolyte materials.

16. A flexible water-proof article of vulcanized fibre comprising a flexible body of vulcanized fibre permeated with a flexible water-repellent condensation product of peptized and disintegrated soy bean protein produced in situ.

ARTEMY A. HORVATH.